United States Patent

Watten

[15] 3,668,660

[45] June 6, 1972

[54] TOUCH WIRE DISPLAYS

[72] Inventor: Laurence Ernest Watten, Langley, England

[73] Assignee: Plessey Handel Und Investments AG, Zug, Switzerland

[22] Filed: Dec. 16, 1970

[21] Appl. No.: 98,799

[52] U.S. Cl. ....................340/365, 179/90 K, 178/17 C

[51] Int. Cl. ....................H03k 13/00

[58] Field of Search ....................340/365, 258 R, 258 C; 179/90 K; 178/17 C, 17.5, 79; 200/DIG. 1; 328/5; 235/145

[56] References Cited

UNITED STATES PATENTS

| | | | |
|---|---|---|---|
| 3,293,640 | 12/1966 | Chalfin et al. | 340/365 |
| 3,482,241 | 12/1969 | Johnson | 340/365 |
| 3,492,440 | 1/1970 | Cerbone et al. | 200/52 |
| 3,437,795 | 4/1969 | Kuljian | 179/90 K |

FOREIGN PATENTS OR APPLICATIONS

| | | | |
|---|---|---|---|
| 1,185,676 | 3/1970 | Great Britain | 340/365 |
| 846,018 | 8/1960 | Great Britain | 340/258 C |

*Primary Examiner*—John W. Caldwell
*Assistant Examiner*—Robert J. Mooney
*Attorney*—Scrivener, Parker, Scrivener & Clarke

[57] ABSTRACT

Each touch-wire contact is connected, by a screened cable in series with a resistor and a 150 K Hz sine wave produced by the generator. A field-effect transistor detection circuit is connected across the resistor. The transistor is not provided with bias and is thus normally cut-off. When a human finger touches the touch-wire contact an a.c. waveform is applied to the base of the transistor causing it to conduct. An important feature of the circuit is the connection of the screen of the screened lead to the generator thereby preventing the cable capacitance from shunting the touch mechanism.

2 Claims, 4 Drawing Figures

TOUCH WIRE DISPLAYS

The present invention relates to electrical devices for sensing human touch and is more particularly, although not exclusively, concerned with such devices for incorporation in so-called touch displays.

In data processing systems, it is often required for human operators to communicate with the data processing devices and touch displays are particularly advantageous in such circumstances. Typically a touch display consists of a number of strategically placed touch responsive elements associated with a cathode ray tube. Ideally the touch responsive elements are placed on the face of the tube, embedded for example in the implosion tube of the cathode ray tube.

Much experiment has been carried out to define the electrical parameters inherent in a human touch. It has been found that the most consistent electrical property, exhibited by the touch of a human finger, is its capacitance to earth and it is an object of this invention to provide a highly sensitive sensing arrangement for use in so-called touch displays.

According to the invention there is provided an electrical device for sensing human touch characterized in that said device includes a series electrical circuit, consisting of a touch contact, a resistor and an alternating current generator connected to earth, and a detection circuit arranged to monitor the current in said resistor.

The invention will be more readily understood from the following description which should be read in conjunction with the accompanying drawings.

OF THE DRAWINGS

FIG. 2 shows a modification of the circuit of FIG. 1,

FIG. 3 shows the combination of two sensing circuits into a single arrangement, while

Figure 1:
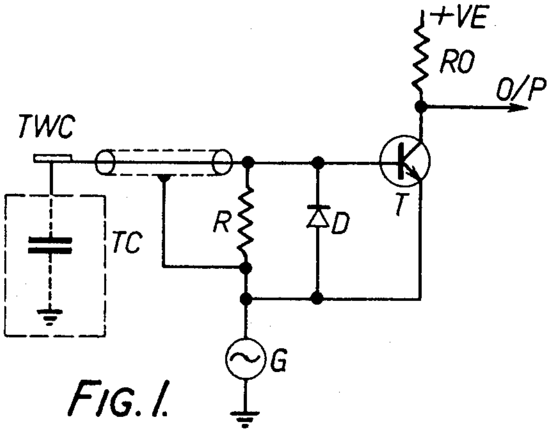
FIG. 1 shows the basic sensing circuit of the invention.

Considering firstly FIG. 1, which shows the basic circuit of the touch sensing circuit of the invention. The touch contact TWC is connected in series with an alternating waveform generator G and a resistor R across which a voltage change is sensed. Typically the waveform generator produces a 150 K Hz sine wave.

As mentioned above it has been found that the most consistent electrical property exhibited by the touch of a human finger is capacitance to earth. Hence the application of a human finger to the touch wire contact TWC effectively places a capacitor TM across the series arrangement of resistor R and the generator G. This causes a current to be applied to the base of transistor T. Transistor T is normally cut off, in the absence of the "touch capacitance" TM as it is not provided with bias. Hence, when the capacitance-to-earth of the touching finger is applied, an output waveform is produced at the collector of transistor T.

It should be noted that the screen of the lead connecting the touch wire contact TWC to the sensing circuit is connected to the generator output instead of being earthed as would be usual in such arrangements. Because of this arrangement the cable capacitance of the touch wire contact lead does not shunt the touch capacitance TM and, therefore, longer leads may be used without derating the sensitivity of the touch sensing circuit. This is of particular importance when the touch contacts are used in conjunction with a so-called touch-wire matrix mounted on the face of a cathode ray tube for example. In such cases the touch sensing circuits will, by physical necessity, be remote from the location of the touch contacts mounted in a cabinet associated with the cathode ray tube display.

The sensing circuit of FIG. 1 includes a diode D connected across the resistor R this diode is provided for d.c. restoration purposes. It should also be pointed out that an n.p.n. transistor has been used in FIG. 1 however a p.n.p. transistor could have been employed with the usual change of collector voltage and the reversal of diode D. In practice the sensing circuit of FIG. 1 has been found to be very sensitive, however, its operation is quite temperature critical.

Figures 2, 3:
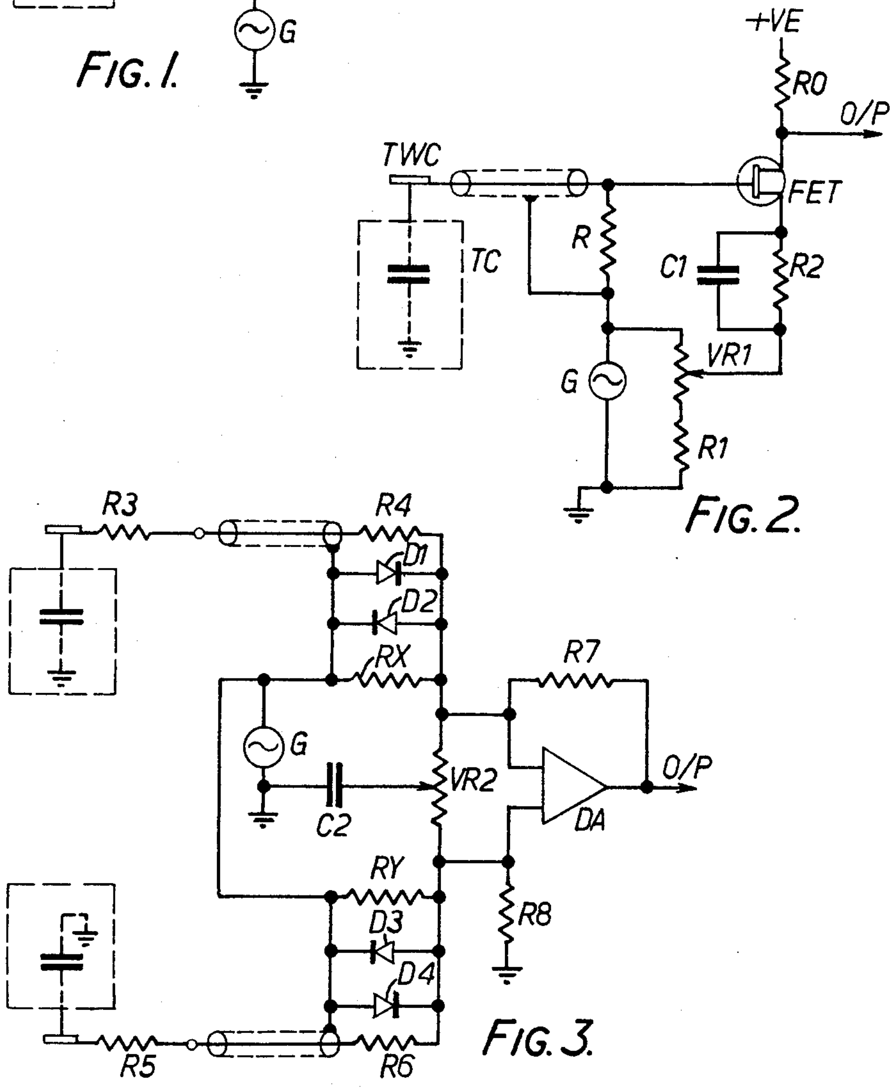

To overcome the problems of temperature change dependency a field effect device FET, FIG. 2, may be used instead of the transistor T of FIG. 1. The sensing circuit of FIG. 2 is effectively the same as that of FIG. 1 with the removal of the d.c. restoration diode which obviously is no longer required due to the use of the field effect device and the addition of a balancing circuit resistors VR1, R1, R2 and capacitor C1. The balancing circuit is included to cancel the in phase output that would otherwise result from small amounts of stray capacitance to earth and the finite slope of the resistance of the field effect device.

The two sensing circuits of FIGS. 1 and 2, described above, envisage the use of a single touch sensing element for each touch contact. In many applications the number of touch contacts provided becomes quite large and for economic considerations it is expedient to attempt to reduce the number of sensing circuits, and associated decoding arrangements, to as few as possible without impairing the sensitivity of the touch sensing arrangements.

FIG. 3 shows how two sensing circuits may be combined in a bridge arrangement which is coupled to a differential amplifier DA. In this circuit resistors RX and RY form two arms of the bridge while the touch capacitances, when applied, form one or other of the two remaining arms. Resistors RX and RY equate to resistor R of FIGS. 1 and 2 performing a similar function in respect of the corresponding touch contact. Resistors R3 and R4 and diodes D1 and D2 form a protection circuit for one half of the differential amplifier while resistors R5 and R6 and diodes D3 and D4 protect the other side of the differential amplifier. Resistors VR2 and capacitor C2 provide a balancing circuit which may be adjusted to compensate for any quiescent imbalance between the two halves of the bridge. The variable resistor VR2 would be adjusted until the differential amplifier DA produces the required "common mode" output signal in the absence of any touch conditions.

The differential amplifier DA may conveniently be formed using a normal operational amplifier, for example a Motarola MC 1435 integrated circuit operational amplifier, connected as shown in FIG. 3 with resistors R7 and R8 of equal value and of the order of 100 K Ω with resistors RX and RY of the order of 1 K Ω.

Under normal quiescent conditions, as shown above, the differential amplifier DA produces a common mode signal on the output lead O/P as the bridge is balanced. When one or other of the associated touch contacts is touched by a human finger current will flow in the corresponding half of the bridge. Hence a difference signal is produced on lead O/P by the differential amplifier DA the phase of which is dependent upon the contact touched.

Figure 4:
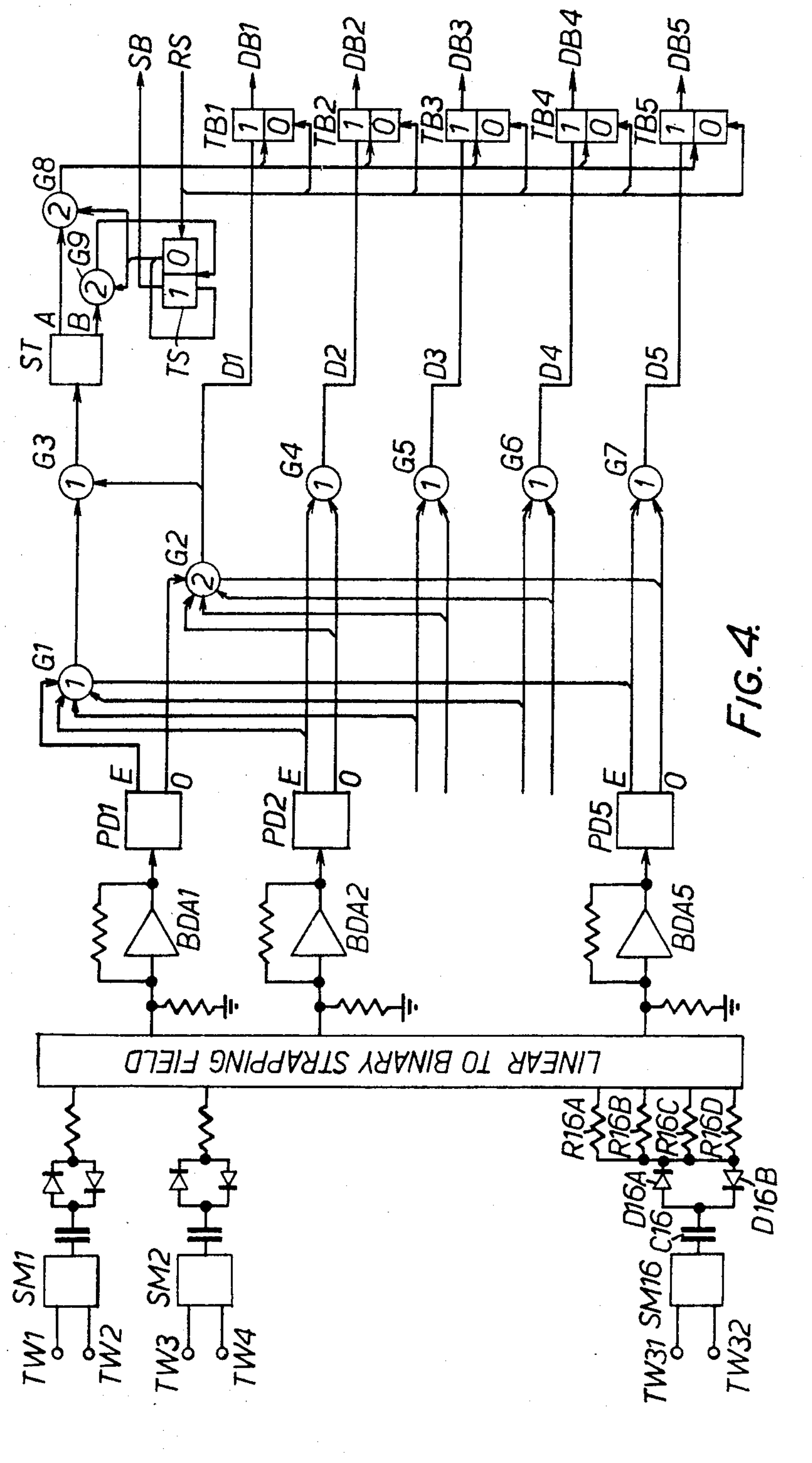
FIG. 4 shows a block diagram of the equipment necessary to define the touch contact operated to a data processing device.

It was mentioned previously that touch sensing circuits of the type according to the invention are used in so-called "-touch wire displays" and FIG. 4 shows, in block forms, a typical example of the equipment which may be used to produce a binary coded indication on leads DB1 to DB5 of the identity of a touched touch contact.

The sensing circuits of FIG. 3 are shown in block form as sense modules SM1 to SM16, there being 32 touch contacts TW1 to TW32 in the example chosen. Only three sensing modules SM1, SM2 and SM16 are shown in FIG. 4 for sake of clarity of that Figure. The bi-phase output from each sensing module is connected, by way of a high-pass filter capacitor to a pair of back-to-back connected diodes. The capacitor additionally prevents any d.c. drift which may occur from being cascaded, while the back-to-back diodes form a non-linear conducting path to the binary digit amplifiers BDA1 to BDA5 ensuring that only relatively large signal excursions on the output of the sense modules are passed on.

The outputs from the sense modules are connected, by way of a "linear-to-binary connection field," to five binary digit amplifiers BDA1 to BDA5. Excluded from this arrangement is the strapping for Data Bit 1 of binary codes indicative of 3, 5, 7, 9 etc. and 31, this data bit being generated by logic later in the circuit. Each amplifier is connected as a summation amplifier causing a binary coded indication of the activated sense module to be produced. Digit amplifier BDA1 producing the least significant bit of the binary code while amplifier BDA5 produces the most significant bit.

The output of each digit amplifier is passed to a corresponding phase detector circuit PD1 to PD5 which produces one of two outputs O or E (i.e., odd or even) dependant upon the phase of the applied signal. The "odd" outputs of phase detections PD1 to PD5 are connected to a five input "OR" gate G2 and similarly the "EVEN" outputs of PD1 to PD5 are connected to "OR" gate G1. The output of gates G1 and G2 "OR" together in gate G3 to produce the drive signal to the Schmitt trigger circuit ST. Two outputs are produced from the trigger circuit ST, one output A corresponding to the Start of the touch period and another output B corresponding to the end of the touch period. A second output from gate G2 (ODD) produces the setting logic for the least significant binary digit, whilst the "ODD" and "EVEN" outputs from phase detection PD 2–5 "OR" together in gates G4–G7 to produce the setting logic for data bits 2 to 5. Output A from the trigger circuit is used to clock in the setting logic into the data toggles TB1 to TB5.

When the operator removes the touch condition output B is produced which sets the schedule toggle TS which produces a schedule bit signal SB to the associated data processing device which may now read the condition of the data leads DB1 to DB5. The setting of toggle TS inhibits gates G8 and G9 preventing the acceptance of a further touch condition before the previous condition has been read by the data processing device.

When the data processing device has read the data on leads DB1 to DB5 it produces a reset signal RS which resets the schedule bit toggle TS and the data toggles TB1 to TB5.

Consideration will now be given to the operation of the equipment of FIG. 4 for the activation of touch contact TW31 (30 + 1). It will be assumed that the sense module SM16 will produce a positive phase difference output upon the touching or touch contact TW31.

The positive phase difference output from sense module SM16 will be passed, by the associated high pass filter capacitor C16 and the threshold circuit (diodes D16A and D16B) to the "linear-to-binary strapping field" via resistors R16 A, B, C and D. The "linear-to-binary strapping field" will cause the positive phase signal from SM16 to be applied to binary digit amplifiers BDA2 to BDA5 (indicative of a code of 01111 i.e., 30). The positive phase signal from digit amplifiers BDA2 to BDA5 produces an odd (0) output from phase detectors PD2 to PD5. This in turn operates the trigger circuit via gates G2 and G3 and also provides the setting logic of data bit 1 via gate G2. Thus the code of 10000 (one) combined with the code of 01111 (30) make up a code of 11111 (31).

The removal of the operator's finger from touch contact TW31 causes a common mode output from sense module SM16 which restores the common mode output from the digit amplifiers BDA2–BDA5 thereby (i) removing the setting logic from the data toggles and (ii) producing a pulse on output B of circuit ST. The pulse on lead B causes the setting of the schedule toggle ST thereby indicating to the data processing device, over lead SB, that a contact of the touch wire matrix on the display has been touched.

The above description of FIG. 4 has been limited to the salient details necessary to understand broadly the incorporation of a touch sensing system into a touch display arrangement and is not intended to be exhaustive of such an arrangement. For example no details of arrangements which are vital to the practical engineering of a touch display system such as the building into such a system circuits to ensure that (i) no more than one contact may be touched at any time or (ii) that touches in excess of a defined duration are only to be considered as valid, have been shown.

What we claim is:

1. An electronically responsive manual keyboard system comprising:

a plurality of human touch activated keyboard contact means arranged electrically in pairs, a plurality of alternating current driven capacitance bridge circuits each having its capacitative arms formed by a circuit including one of a pair of said touch activated contact means, a plurality of two-input differential amplifiers each individually connected as a bridge detector circuit and arranged to provide (1) a first output condition when a particular one of a pair of touch activated contacts is activated, (ii) a second output condition when the other of said pair of touch activated contacts is activated and (iii) a null output condition when neither of said pair of touch activated contacts are activated and a binary coding arrangement to which the outputs from all of said differential amplifiers are connected and adapted to produce a binary coded indication of an activated touch contact means.

2. An electronically responsive manual keyboard system as defined in claim 1 wherein each of said pairs of human touch activated contact means are connected to the inputs of said differential amplifiers by way of co-axial leads the screens of which are connected to the source of alternating current.

* * * * *